(12) United States Patent
Nitsan et al.

(10) Patent No.: US 10,372,513 B2
(45) Date of Patent: Aug. 6, 2019

(54) CLASSIFICATION OF APPLICATION EVENTS USING CALL STACKS

(71) Applicant: ENTIT Software LLC, Sunnyvale, CA (US)

(72) Inventors: Amichai Nitsan, Yehud (IL); Haim Shuvali, Yehud (IL); Hana Giat, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/564,541

(22) PCT Filed: Apr. 30, 2015

(86) PCT No.: PCT/US2015/028401
§ 371 (c)(1),
(2) Date: Oct. 5, 2017

(87) PCT Pub. No.: WO2016/175810
PCT Pub. Date: Nov. 3, 2016

(65) Prior Publication Data
US 2018/0089004 A1   Mar. 29, 2018

(51) Int. Cl.
*G06F 9/54* (2006.01)
*G06F 16/23* (2019.01)
*G06F 11/34* (2006.01)

(52) U.S. Cl.
CPC .......... *G06F 9/542* (2013.01); *G06F 11/3409* (2013.01); *G06F 11/3466* (2013.01); *G06F 16/2379* (2019.01); *G06F 11/3476* (2013.01); *G06F 2201/86* (2013.01); *G06F 2201/865* (2013.01); *G06F 2209/544* (2013.01)

(58) Field of Classification Search
CPC .................................................... G06F 9/542
USPC ........................................................ 719/318
See application file for complete search history.

(56) References Cited

U.S. PATENT DOCUMENTS

| | | | |
|---|---|---|---|
| 8,310,943 B2 | 11/2012 | Mehta et al. | |
| 8,458,681 B1 * | 6/2013 | Coutant | G06F 11/3624 717/124 |
| 8,635,339 B2 | 1/2014 | Luna | |

(Continued)

FOREIGN PATENT DOCUMENTS

EP   2565785 A1   3/2013

OTHER PUBLICATIONS

Ivan, C. et al, Cloud Based Ross Platform Mobile Applications Building and Integrating Cloud Services with Mobile Client Applications, (Research Paper), Mar. 2014. 12 pgs.

(Continued)

*Primary Examiner* — Andy Ho

(57) ABSTRACT

A computing device includes at least one processor and a machine-readable storage medium storing instructions. The instructions may be executable by the hardware processor to, in response to a detection of an application event during execution of an application, read a plurality of entries included in a call stack at a time of the application event. The instructions are also executable to determine a classification identifier for the application event using the plurality of entries included in the call stack, and store information about the application event in a database entry associated with the classification identifier.

20 Claims, 8 Drawing Sheets

(56) References Cited

U.S. PATENT DOCUMENTS

| | | |
|---|---|---|
| 8,886,769 B2 | 11/2014 | Thibeault et al. |
| 8,984,628 B2 | 3/2015 | Mahaffey et al. |
| 9,189,214 B2 * | 11/2015 | Gschwind ........... G06F 9/30134 |
| 9,417,988 B2 * | 8/2016 | Weiner ................ G06F 11/3636 |
| 2003/0135847 A1 | 7/2003 | Gouriou et al. |
| 2004/0148594 A1 | 7/2004 | Williams |
| 2007/0006168 A1 | 1/2007 | Dimpsey et al. |
| 2009/0089805 A1 * | 4/2009 | Srinivasan .......... G06F 11/3409 |
| | | 719/318 |
| 2013/0179735 A1 | 7/2013 | Buckhurst et al. |
| 2013/0205366 A1 | 8/2013 | Luna et al. |
| 2014/0215628 A1 | 7/2014 | Yan |

OTHER PUBLICATIONS

International Searching Authority., International Search Report and Written Opinion dated Jan. 21, 2016 for PCT Application No. PCT/US2015/028401 Filed Apr. 30, 2015, 9 pages.

* cited by examiner

CLASSIFICATION OF APPLICATION EVENTS USING CALL STACKS

BACKGROUND

Computing devices may enable the use of software applications. Some types of software applications include native applications, web applications, and rich client applications. A web application is a website that is designed to be viewed in a web browser executing on the computing device. For example, some web applications include e-mail, search engines, and social media applications. Further, a native application is a software application specially designed to execute on a particular computing device. For example, a mobile native application may be coded to execute on a particular mobile platform or device (e.g., on a particular smartphone). A rich client application is a client-server application in which most of the application processing is performed on the client device. Some rich client applications may run as stand-alone applications on the computing device.

BRIEF DESCRIPTION OF THE DRAWINGS

Some implementations are described with respect to the following figures.

DETAILED DESCRIPTION

Some software and service providers may wish to track performance characteristics of applications during actual executions. For example, a provider of a social media application may collect information on key events occurring during execution of the application, and may use this event information when designing future versions of the application. To analyze the information for a particular event, the information may be "classified" or grouped into a particular class of events. In some examples, event information may be classified based on some content of the event. for example, requests in web applications are typically classified according to a uniform resource locator (URL) included or associated with the requests. However, the content associated with events can vary substantially during different executions of an application. As such, classification based on event content may not provide sufficiently accurate and/or useful classifications.

In accordance with some implementations, examples are provided for classification of events based on application logic. As described further below, some implementations include determining the entries of a call stack at the execution time of an application event. The call stack entries may be used to generate a classification identifier for the application event. The classification identifier may enable grouping of events based on a logical path within the application. As such, some implementations may provide accurate and/ or useful classification of application events.

Figure 1:
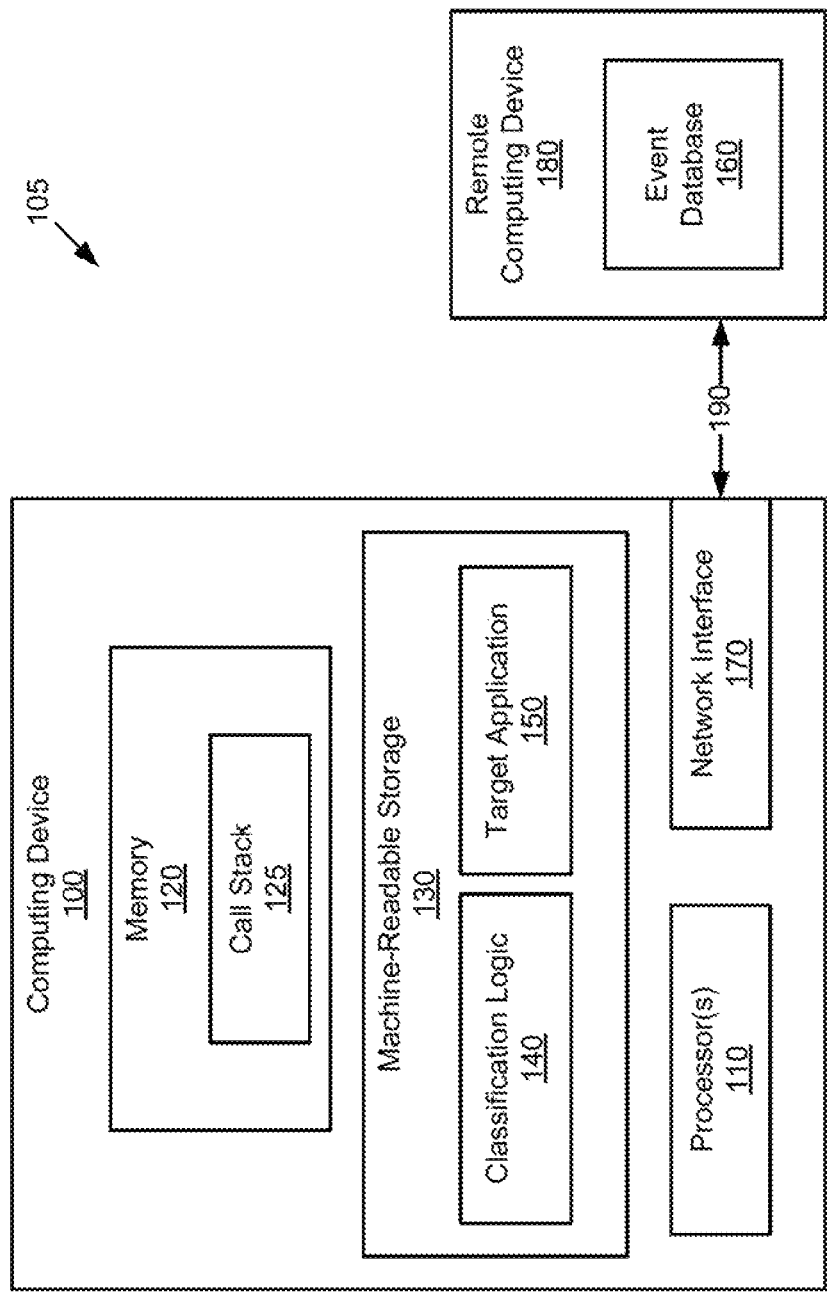
FIG. 1 is a schematic diagram of an example computing device, in accordance with some implementations.

FIG. 1 a schematic diagram of an example system 105 for event classification, in accordance with some implementations. As shown, the example system 105 may include a computing device 100 and a remote computing device 180. The computing device 100 may be, for example, a computer, a portable device, a server, a network client, a communication device, etc. Further, the computing device 100 may be any grouping of related or interconnected devices, such as a blade server, a computing cluster, and the like. Furthermore, in some implementations, the computing device 100 may be a dedicated appliance or device for classification and analysis of applications events.

As shown, the computing device 100 can include processor(s) 110, memory 120, machine-readable storage 130, and a network interface 170. The processor(s) 110 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

The network interface 170 can provide inbound and outbound network communication. The network interface 170 can use any network standard or protocol (e.g., Ethernet, Fibre Channel, Fibre Channel over Ethernet (FCoE), Internet Small Computer System Interface (iSCSI), a wireless network standard or protocol, etc.). In some implementations, the network interface 170 may enable the computing device 100 to establish a network connection 190 with the remote computing device 180. The remote computing device 180 may be, for example, a portable computer, a server, a blade server, a computing cluster, a desktop computer, and the like. In some implementations, the remote computing device 180 may include and event database 160. Further, in some examples, the remote computing device 180 may be a web server.

In some implementations, the machine-readable storage 130 can include non-transitory storage media such as hard drives, flash storage, optical disks, etc. As shown, the machine-readable storage 130 can include classification logic 140, and a target application 150. The target application 150 may be any instructions (e.g., software application) that executes on the computing device 100. For example, the target application 150 may be a mobile native application, a web application, a rich client application, and so forth.

In some implementations, during execution of the target application 150, the memory 120 may include a call stack 125. The call stack 125 may be a stack data structure that stores information about the currently-active calls of a computer program executed by the processor(s) 110 (e.g., the target application 150). As used herein, a "call" may refer to a command or instruction to invoke or execute a function, a method, a subroutine, a procedure, an so forth. For example, in a hypertext transfer protocol (HTTP) application, a call command may be an HTTP request such as GET, PUT, CONNECT, and POST requests.

As shown in FIG. 1, the classification logic 140 may be implemented as instructions stored in the machine-readable storage 130. However, the classification logic 140 can be implemented in any suitable manner. For example, some or all of the classification logic 140 could be implemented as instrumentation of the target application 150. Further, some or all of the classification logic 140 could be hard-coded as circuitry included in the processor(s) 110 and/or the computing device 100. Furthermore, some or all of the classification logic 140 could be implemented on a remote computer (not shown). The classification logic 140 may be a controller of the computing device 100.

In some implementations, the classification logic 140 may detect events during execution of the target application 150. In response to detecting an application event, the classification logic 140 may read or otherwise determine a set of entries included in the call stack 125 at the time of the application event. Further, the classification logic 140 may determine a classification identifier using the set of entries in the call stack 125. For example, in some implementations, the classification identifier may include an identifier for each call or function included in the call stack 1255. An example of determining the classification identifier is described below with reference to FIGS. 2-4.

In some implementations, the classification logic 140 may store information about the application event in the event database 160. For example, the classification logic 140 may create a new entry in the event database 160 to store performance data for each application event. Further, the new entry may also store the classification identifier for the application event.

In some implementations, each entry of the event database 160 may aggregate information for a unique classification identifier. Further, if the event database 160 does not include an existing entry corresponding to the classification identifier, the classification logic 140 may create a new entry associated with the classification identifier. Otherwise, if the event database 160 already includes an existing entry corresponding to the classification identifier, the classification logic 140 may update the existing entry to include information about the application event.

In some implementations, the entries of the event database 160 may be used to determine metrics for application events. For example, the classification logic 140 may analyze data included in the entries of the event database 160, and may thereby determine performance, quality, and/or customer satisfaction metrics for various classes of application events. Such metrics may include response time, error rate, call frequency, processor usage, memory usage, crash statistics, network load, service level agreement satisfaction, and so forth. In some implementations, the classification logic 140 may perform statistical analysis of the event database 160. The event database 160 may be relational database, an object database, an extensible markup language (XML) database, a flat file, or any other data structure.

Note that, while FIG. 1 shows an example implementation, other implementations are possible. For example, some or all of the classification logic 140 may be included in the remote computing device 180. In another example, some or all of the event database 160 may be included in the computing device 100. In still another example, some or all of the target application 150 may be included in the remote computing device 180. Other combinations and/or variations are also possible.

Figure 2:
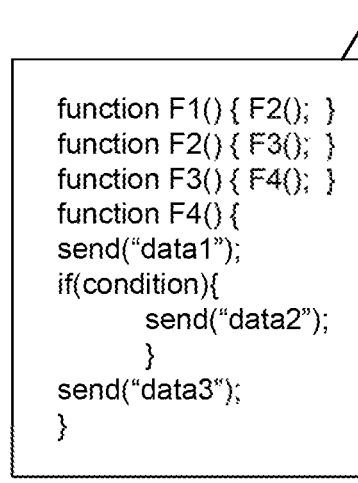
FIG. 2 is an example of program code in accordance with some implementations.

Referring now to FIG. 2, shown is an example of a code segment 200, in accordance with some implementations. As shown, the code segment 200 includes calls for the functions "F1," "F2," "F3," and "F4." Further, the code segment 200 includes three calls for the function "send." In some implementations, the code segment 200 may be instrumented by classification logic 140. An example of instrumentation of the code segment 200 is described below with reference to FIG. 3.

Figure 3:
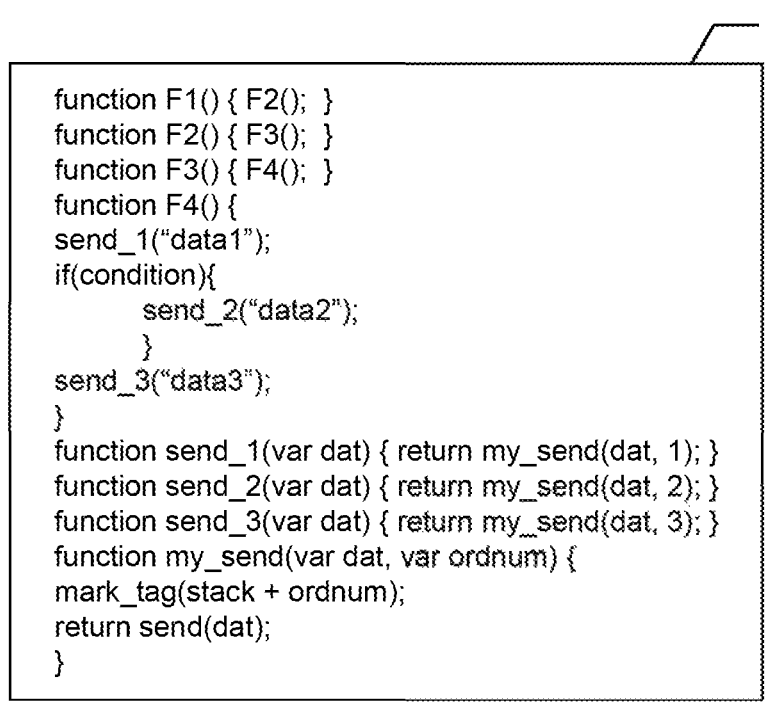
FIG. 3 is an illustration of example of instrumented program code according to some implementations.

Referring now to FIG. 3, shown is an example of an instrumented code segment 300, in accordance with some implementations. Specifically, the instrumented code segment 300 has been instrumented such that, when a "send" function is executed, the "mark_tag" function is executed to create a classification identifier or tag. Further, the classification identifier includes the ordinal number "ordnum" (i.e., 1, 2, or 3) to identify each instance of the "send" function in the order in which it appears in the instrumented code segment 300.

Figure 4:
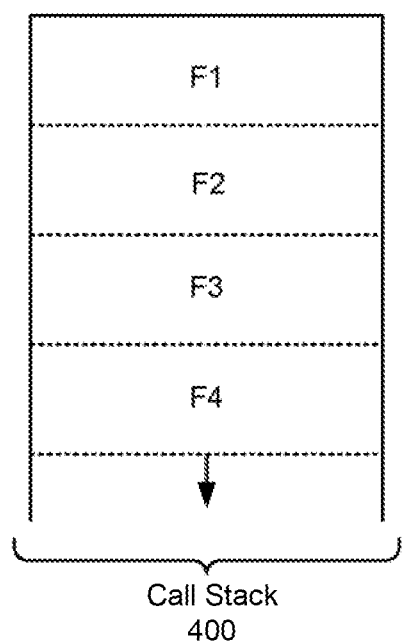
FIG. 4 is a schematic diagram of an example call stack according to some implementations.

Referring now to FIG. 4, shown is an example of a call stack 400, in accordance with some implementations. As indicated by an arrow, the call stack 400 may grow in a downward direction. Assume that FIG. 4 illustrates the state of the call stack 400 at the time that one of the "send" functions is executed in the instrumented code segment 300 (shown in FIG. 3). Accordingly, the call stack 400 includes for entries, corresponding to the execution order of the functions "F1," "F2," "F3," and "F4" in the instrumented code segment 300.

Assume that, in response to executing the function "send_1," the "mark_tag" function reads the entries of the call stack 400, and generates a classification identifier using these entries. Thus, in this example, the resulting classification identifier may be represented by the tag "F1/F2/F3/F4/send1." Further, assume that, when the function "send_2" is executed, the resulting classification identifier is represented by the tag "F1/F2/F3/F4/send2." Furthermore, assume that, when the function "send_3" is executed, the resulting classification identifier is represented by the tag "F1/F2/F3/F4/send3." Note that these tags are provided as examples, and do not limit any implementations.

Figure 5:
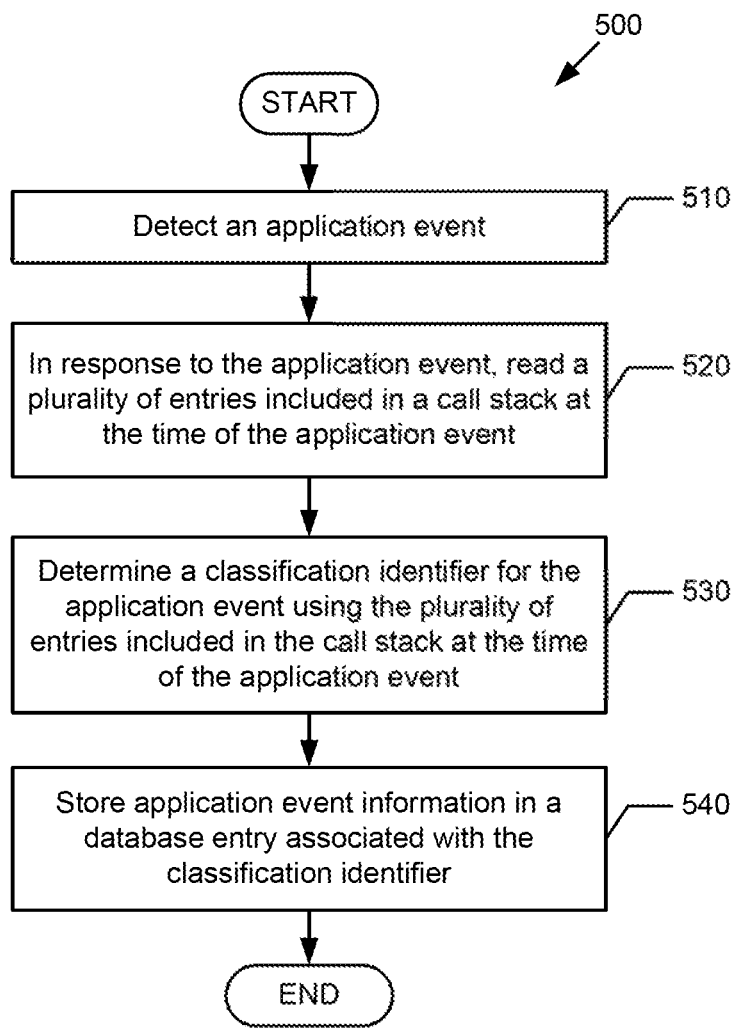
FIG. 5 is an example flow diagram of an example process for classification in accordance with some implementations.

Referring now to FIG. 5, shown is a process 500 for classifying an application event, in accordance with some implementations. The process 500 may be performed by the processor(s) 110 and/or the classification logic 140 shown in FIG. 1. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1-4, which show examples in accordance with some implementations. However, other implementations are also possible.

At 510, an application event may be detected. For example, referring to FIG. 1, the classification logic 140 may receive an indication of a call command executed as part of the target application 150. In some implementations, the call command may be detected by instrumentation included in the target application 150. Further, in some implementations, the call command may be a hypertext transfer protocol (HTTP) request executed by the target application 150.

At 520, in response to the application event, a set of entries included in a call stack at a time of the application event may be read. For example, referring to FIGS. 1-4, in response to the function "send_1" being executed, the classification logic 140 may read or otherwise obtain the call identifiers "F1," "F2," "F3," and "F4" for the entries of the call stack 400.

At 530, a classification identifier for the application event may be determined using the entries included in the call stack at a time of the application event. In some implementations, the classification identifier may include call identifiers associated with a set of call stack entries. Further, the call identifiers may be placed in a coded sequence (e.g., separated by a delimiter). The classification identifier may also include an ordinal number to indicate an order of the application event. For example, referring to FIGS. 1-4, the classification logic 140 may use entries of the call stack 400 to generate the classification identifier "F1/F2/F3/F4/send1."

At 540, information related to the application event may be stored in a database entry associated with the classification identifier. For example, referring to FIG. 1, the classification logic 140 may store information related to the function "send_1" in an entry of the event database 160. In some implementations, the database entry may be created to store information related to the detected application event. In some implementations, the database entry may aggregate information for all events in a class uniquely identified by the classification identifier. In some implementations, if an entry with the classification identifier does not already exist in the database 160, the classification logic 140 may create a new entry. Otherwise, if an entry with the classification identifier already exists in the database 160, the classification logic 140 may update that entry using the information related to the call command. After 540, the process 500 is completed.

Figure 6:
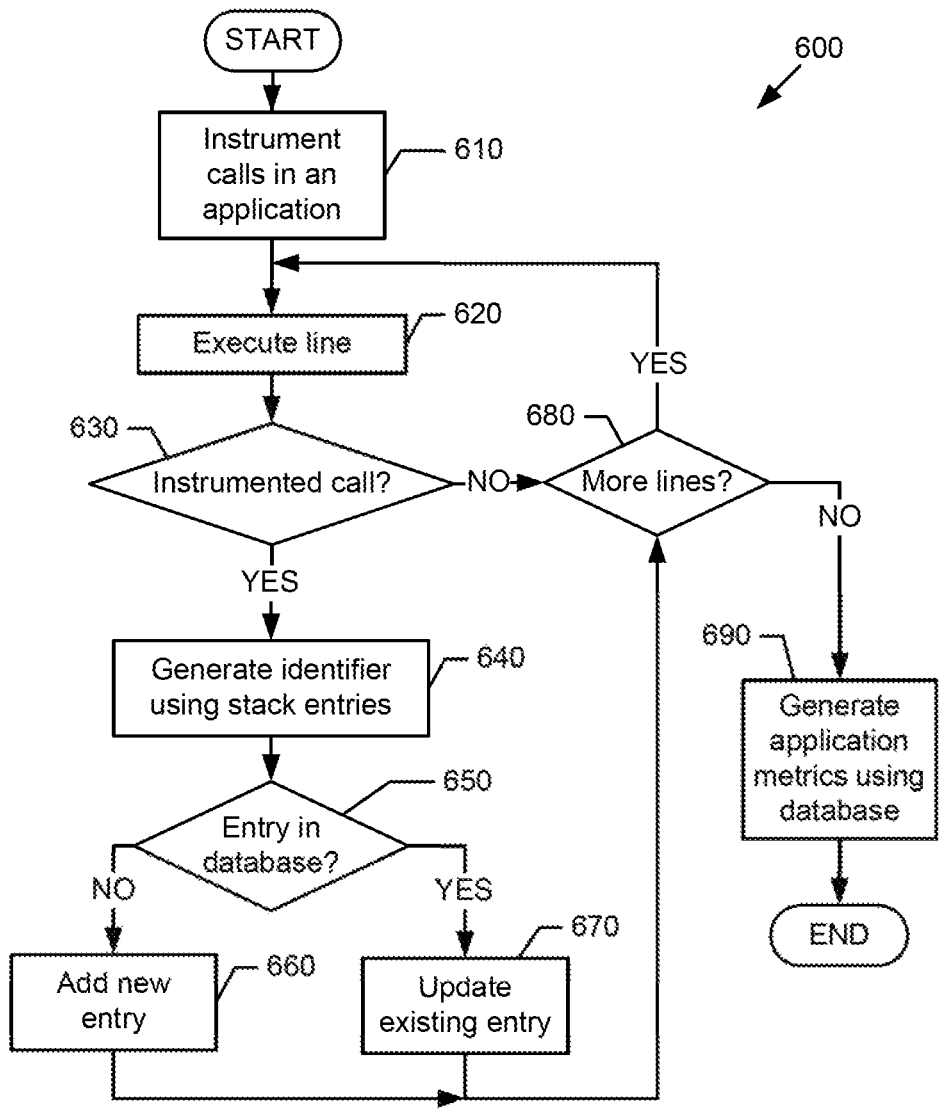
FIG. 6 is an example flow diagram of an example process for generating applications statistics in accordance with some implementations.

Referring now to FIG. 6, shown is a process 600 for event classification in accordance with some implementations. The process 600 may be performed by the processor(s) 110 and/or the classification logic 140 shown in FIG. 1. The process 600 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 600 may be described below with reference to FIGS. 1-4, which show examples in accordance with some implementations. However, other implementations are also possible.

At 610, calls in an application may be instrumented. For example, referring to FIG. 1, a set of calls included in the target application 150 may be instrumented to enable collection of event information. Further, as described above with reference to FIG. 3, the application may be instrumented with the "mark_tag" function to create a classification identifier for each executed call. In some implementations, the call may be a hypertext transfer protocol (HTTP) request executed by the target application 150.

At 620, a line of the instrumented application may be executed. At 630, a determination is made about whether the current line includes and instrumented call. If not, the process 600 continues at 680 (described below). However, if it is determined at 630 that the current line includes and instrumented call, then at 640, a classification identifier for the call may be generated using entries included in a call stack. For example, referring to FIGS. 1-4, the instrumented code may use the call identifiers "F1," "F2," "F3," and "F4" included in the call stack 400 when the call "send_1" is executed, and may then generate the classification identifier "F1/F2/F3/F4/send1."

At 650, a determination is made about whether an entry associated with the classification identifier is included in an event database. If not, then at 660, a new entry is added to the database. The new entry may include information related to the executed call. For example, referring to FIG. 1, the classification logic 140 may update the event database 160 to include a new entry associated with the classification identifier "F1/F2/F3/F4/send1." After 660, the process 600 continues at 680 (described below).

However, if it is determined at 650 that an existing entry associated with the classification identifier is included in the event database, then at 670, the existing entry may be updated to include the information related to the executed call. For example, referring to FIG. 1, the classification logic 140 may update an existing entry of the event database 160 to include performance information related to the execution of the "send1" call. After 670, the process 600 continues at 680.

At 680, a determination is made about whether there are any more lines of the instrumented application to be processed. If so, the process 600 returns to 620 to execute the next line of the instrumented application. However, if there are no more lines to be processed, then at 690, an application metric may be generated using the event database. For example, referring to FIG. 1, after execution of the target application 150 is completed, the classification logic 140 may analyze entries of the event database 160 to determine performance metrics for the target application 150. After 690, the process 600 is completed.

Figure 7:
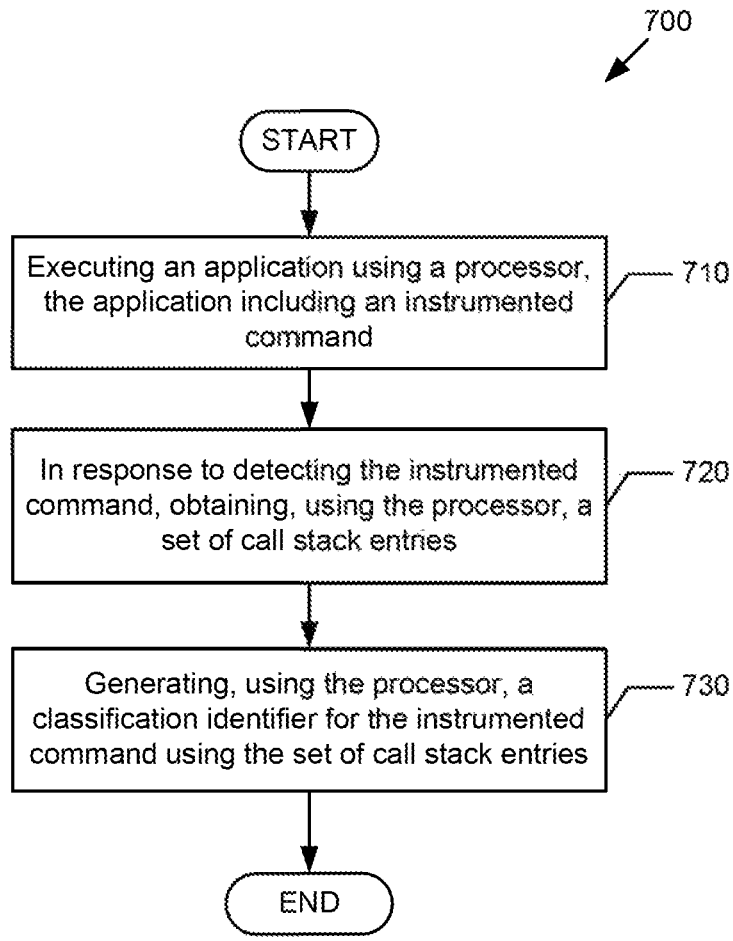
FIG. 7 is an example flow diagram of an example process for classification in accordance with some implementations.

Referring now to FIG. 7, shown is a process 700 for classifying an application event, in accordance with some implementations. The process 700 may be performed by the processor(s) 110 and/or the classification logic 140 shown in FIG. 1. The process 700 may be implemented in hardware or machine-readable instructions (e.g., software and/or firmware). The machine-readable instructions are stored in a non-transitory computer readable medium, such as an optical, semiconductor, or magnetic storage device.

At 710, an application may be executed using a processor. The application may include an instrumented command. At 720, in response to detecting the instrumented command in the executed application, a set of call stack entries may be obtained using the processor. At 730, a classification identifier for the instrumented command may be generated by the processor using the set of call stack entries. After 730, the process 700 is completed.

Figure 8:
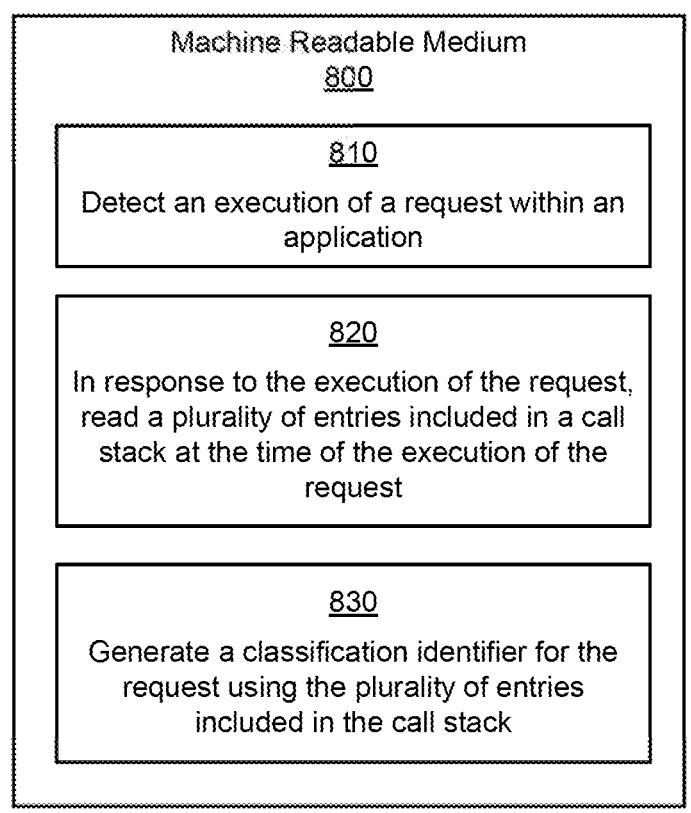
FIG. 8 is an example diagram of an example machine-readable storage medium storing instructions in accordance with some implementations.

Referring now to FIG. 8, shown is a machine-readable storage medium 800 storing instructions 810-820, in accordance with some implementations. the instructions 810-830 can be executed by any number of processors (e.g., the processor(s) 110 shown in FIG. 1). The machine-readable storage medium 800 may be any non-transitory computer readable medium, such as an optical, semiconductor, or magnetic storage device.

As shown, instruction 810 may detect an execution of a request within an application. Further, instruction 820 may, in response to the execution of the request, read a plurality of entries included in a call stack at the time of the execution of the request. Instruction 830 may generate a classification identifier for the request using the plurality of entries.

Figure 9:
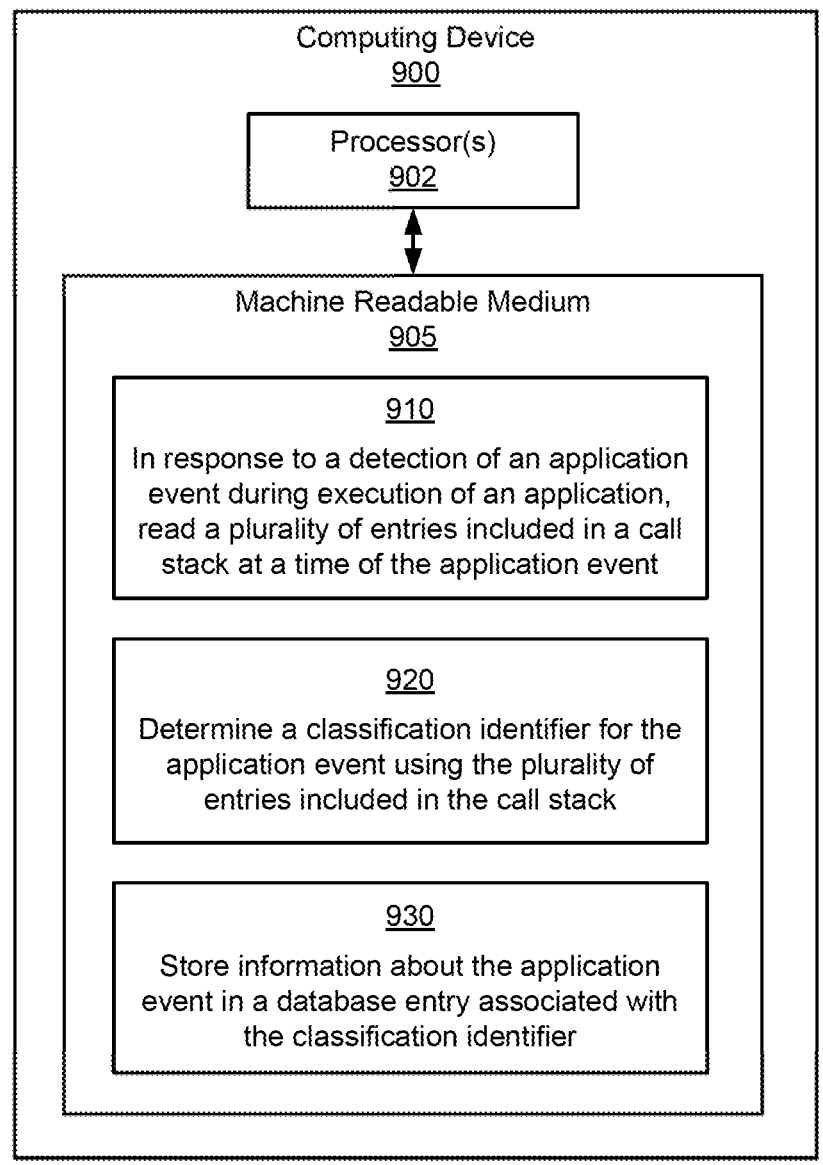
FIG. 9 is a schematic diagram of an example computing device, in accordance with some implementations.

Referring now to FIG. 9, shown is a schematic diagram of an example computing device 900. In some examples, the computing device 900 may correspond generally to the computing device 100 shown in FIG. 1. As shown, the computing device 900 can include a hardware processor(s) 902 and machine-readable storage medium 905. The machine-readable storage medium 905 may store instructions 910-930. The instructions 910-930 can be executed by the hardware processor(s) 902. As shown, instruction 910 may, in response to a detection of an application event during execution of an application, read a plurality of entries included in a call stack at a time of the application event. Further, instruction 920 may determine a classification identifier for the application event using the plurality of entries included in the call stack. Instruction 930 may store information about the application event in a database entry associated with the classification identifier.

In accordance with some implementations, techniques or mechanisms are provided for classification of events based on application logic. Some implementations include generating a classification identifier using entries of a call stack at the tie of an application event. This classification identifier may be used to classify events based on a logical path within the application. Further, the classification identifier may be used to generate metrics for the application. Accordingly, some implementations may provide accurate and/or useful classification and performance measurement of application events.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
    a hardware processor; and
    a machine-readable storage medium storing instructions, the instructions executable by the hardware processor to:
        in response to a detection of an application event during execution of an application, read a plurality of entries included in a call stack at a time of the application event;
        determine a classification identifier for the application event using the plurality of entries included in the call stack, wherein the classification identifier includes a plurality of identifiers associated with the plurality of entries included in the call stack, wherein the classification identifier includes the plurality of identifiers in an ordered sequence, and wherein the classification identifier further includes an ordinal number to indicate an order of the application event; and
        store performance information about the application event in a database entry associated with the classification identifier.

2. The computing device of claim 1, wherein the application event is an execution of a particular type of call in the application.

3. The computing device of claim 1, the instructions further executable to:
    in response to a determination that a database does not include an existing database entry associated with the classification identifier, create a new database entry associated with the classification identifier.

4. The computing device of claim 1, the instructions further executable to determine a performance metric using performance information stored in a plurality of database entries, wherein each of the plurality of database entries corresponds to a unique classification identifier.

5. The computing device of claim 1, wherein the plurality of entries included in the call stack correspond to a plurality of calls, and wherein the classification identifier includes an identifier for each of the plurality of calls.

6. The computing device of claim 1, wherein the ordered sequence in the classification identifier comprises each of the plurality of identifiers being separated by a delimiter.

7. The computing device of claim 1, wherein the plurality of entries are arranged in a particular order within the call stack, and wherein the ordered sequence in the classification identifier is arranged so the plurality of identifiers match the particular order of the plurality of entries in the call stack.

8. A method comprising:
    executing an application using a processor, the application including an instrumented command;
    in response to detecting the instrumented command, obtaining, using the processor, a set of call stack entries; and
    generating, using the processor, a classification identifier for the instrumented command using the set of call stack entries, wherein the classification identifier includes a plurality of identifiers associated with the set of call stack entries, wherein the classification identifier includes the plurality of identifiers in an ordered sequence, and wherein the classification identifier further includes an ordinal number to indicate an order of the instrumented command in the application.

9. The method of claim 8, further comprising storing performance information about an execution of the instrumented command in a database.

10. The method of claim 9, further comprising, in response to a determination that the database does not include an entry associated with the classification identifier:
    adding a new entry associated with the classification identifier to the database, the new entry to store the performance information.

11. The method of claim 9, further comprising generating a performance metric using the database.

12. The method of claim 9, wherein the database comprises a plurality of entries, wherein each of the plurality of entries is uniquely associated with one of a plurality of classification identifiers.

13. The method of claim 8, wherein the ordered sequence in the classification identifier comprises each of the plurality of identifiers being separated by a delimiter.

14. The method of claim 8, wherein the plurality of entries are arranged in a particular order within the call stack, and wherein the ordered sequence in the classification identifier is arranged so the plurality of identifiers match the particular order of the plurality of entries in the call stack.

15. An article comprising a machine-readable storage medium storing instructions that upon execution cause a processor to:
   detect an execution of a request within an application;
   in response to the execution of the request, read a plurality of entries included in a call stack at the time of the execution of the request; and
   generate a classification identifier for the request using the plurality of entries included in the call stack, wherein the classification identifier includes a plurality of identifiers associated with the plurality of entries included in the call stack, wherein the classification identifier includes the plurality of identifiers in an ordered sequence, and wherein the classification identifier further includes an ordinal number to indicate an order of the request in the application.

16. The article of claim 15, wherein the request is a hypertext transfer protocol (HTTP) request.

17. The article of claim 15, wherein the instructions further cause the processor to:
   store application performance information in a first database entry associated with the classification identifier, wherein the first database entry is one of a plurality of entries in a database, wherein each of the plurality of entries is uniquely associated with one of a plurality of classification identifiers.

18. The article of claim 17, wherein the instructions further cause the processor to:
   determine a performance metric for the classification identifier using the application performance information stored in the first database entry.

19. The article of claim 15, wherein the ordered sequence in the classification identifier comprises each of the plurality of identifiers being separated by a delimiter.

20. The article of claim 15, wherein the plurality of entries are arranged in a particular order within the call stack, and wherein the ordered sequence in the classification identifier is arranged so the plurality of identifiers match the particular order of the plurality of entries in the call stack.

\* \* \* \* \*